US010303586B1

(12) United States Patent
Falko

(10) Patent No.: US 10,303,586 B1
(45) Date of Patent: May 28, 2019

(54) SYSTEMS AND METHODS OF INTEGRATED TESTING AND DEPLOYMENT IN A CONTINUOUS INTEGRATION CONTINUOUS DEPLOYMENT (CICD) SYSTEM

(71) Applicant: salesforce.com, inc., San Francisco, CA (US)

(72) Inventor: Andrey Falko, Oakland, CA (US)

(73) Assignee: SALESFORCE.COM, INC., San Francisco, CA (US)

(*) Notice: Subject to any disclaimer, the term of this patent is extended or adjusted under 35 U.S.C. 154(b) by 0 days.

(21) Appl. No.: 16/025,025

(22) Filed: Jul. 2, 2018

(51) Int. Cl.
G06F 11/36 (2006.01)

(52) U.S. Cl.
CPC ........ G06F 11/368 (2013.01); G06F 11/3636 (2013.01)

(58) Field of Classification Search
None
See application file for complete search history.

(56) References Cited

U.S. PATENT DOCUMENTS

| 6,496,850 | B1 * | 12/2002 | Bowman-Amuah | G06F 9/4493 709/203 |
| 8,037,453 | B1 * | 10/2011 | Zawadzki | G06F 11/368 717/107 |
| 9,158,514 | B2 * | 10/2015 | Guan | G06F 11/368 |
| 9,286,188 | B1 * | 3/2016 | Chopra | G06F 8/71 |
| 9,311,220 | B1 * | 4/2016 | Ha | G06F 11/3636 |
| 9,323,644 | B1 * | 4/2016 | Hale | G06F 16/2237 |
| 9,547,579 | B1 * | 1/2017 | Shen | G06F 11/362 |
| 9,606,900 | B1 * | 3/2017 | Pradhan | G06F 16/148 |
| 9,678,718 | B1 * | 6/2017 | Bienkowski | G06F 8/20 |
| 9,690,550 | B2 * | 6/2017 | Kee | G06F 8/34 |
| 9,720,813 | B2 * | 8/2017 | Liu | G06F 11/368 |
| 9,880,924 | B2 * | 1/2018 | Peck | G06F 11/3696 |
| 10,089,213 | B1 * | 10/2018 | Noble | G06F 11/3604 |
| 2005/0183074 | A1 * | 8/2005 | Alexander, III | G06F 11/3447 717/144 |
| 2005/0183075 | A1 * | 8/2005 | Alexander, III | G06F 8/443 717/144 |
| 2010/0153919 | A1 * | 6/2010 | Kramer | G06Q 10/06 717/122 |
| 2013/0152047 | A1 * | 6/2013 | Moorthi | G06F 11/368 717/124 |
| 2013/0283102 | A1 * | 10/2013 | Krajec | G06F 11/3636 714/38.1 |
| 2014/0082329 | A1 * | 3/2014 | Ghose | G06F 9/3877 712/208 |

(Continued)

Primary Examiner — Isaac T Tecklu
(74) Attorney, Agent, or Firm — Morris & Kamlay LLP

(57) ABSTRACT

Systems and methods are provided for receiving a code change at a continuous integration and continuous deployment (CICD) server system, generating a unique change identifier, generating a new code build which includes the code change, testing the generated new code build by performing a code trace for phase of testing or production environment based on at least one predetermined testing parameter that includes a predetermined trace time for the code change of the generated change identifier, and displaying test results for the change identifier for the phase of testing or production environment to visually highlight a pass or failure of the testing for the code change based on the predetermined testing parameter for the predetermined trace time.

16 Claims, 11 Drawing Sheets

(56) References Cited

U.S. PATENT DOCUMENTS

| | | | |
|---|---|---|---|
| 2015/0026121 A1* | 1/2015 | Shani | G06F 11/3688 |
| | | | 707/609 |
| 2015/0347273 A1* | 12/2015 | Krajec | G06F 11/3433 |
| | | | 717/128 |
| 2016/0239295 A1* | 8/2016 | Kolesnik | G06F 8/71 |
| 2016/0259713 A1* | 9/2016 | Belur | G06F 11/3676 |
| 2017/0046245 A1* | 2/2017 | Liu | G06F 11/368 |
| 2017/0075789 A1* | 3/2017 | Skinner | G06F 11/3664 |
| 2017/0235661 A1* | 8/2017 | Liu | G06F 11/3604 |
| | | | 717/106 |
| 2018/0218005 A1* | 8/2018 | Kuhtz | G06F 8/44 |
| 2018/0270327 A1* | 9/2018 | Banyard | H04L 67/36 |
| 2018/0349257 A1* | 12/2018 | Bhattacharjee | G06F 11/3688 |

\* cited by examiner

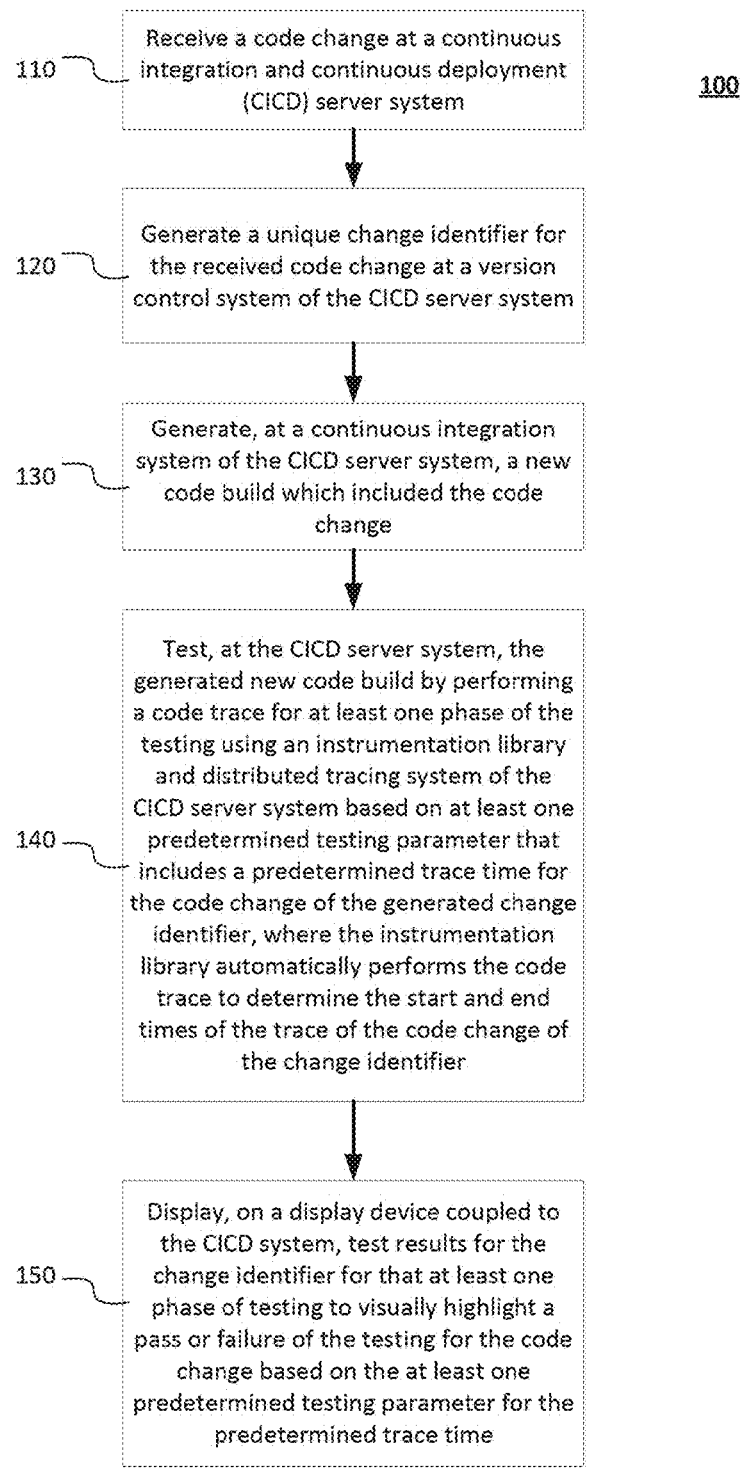

| Rank | Change Identifier |
|---|---|
| 1 | ghijkl |
| 2 | abcdef |
| 3 | qwerty |
| 4 | xyzabc |

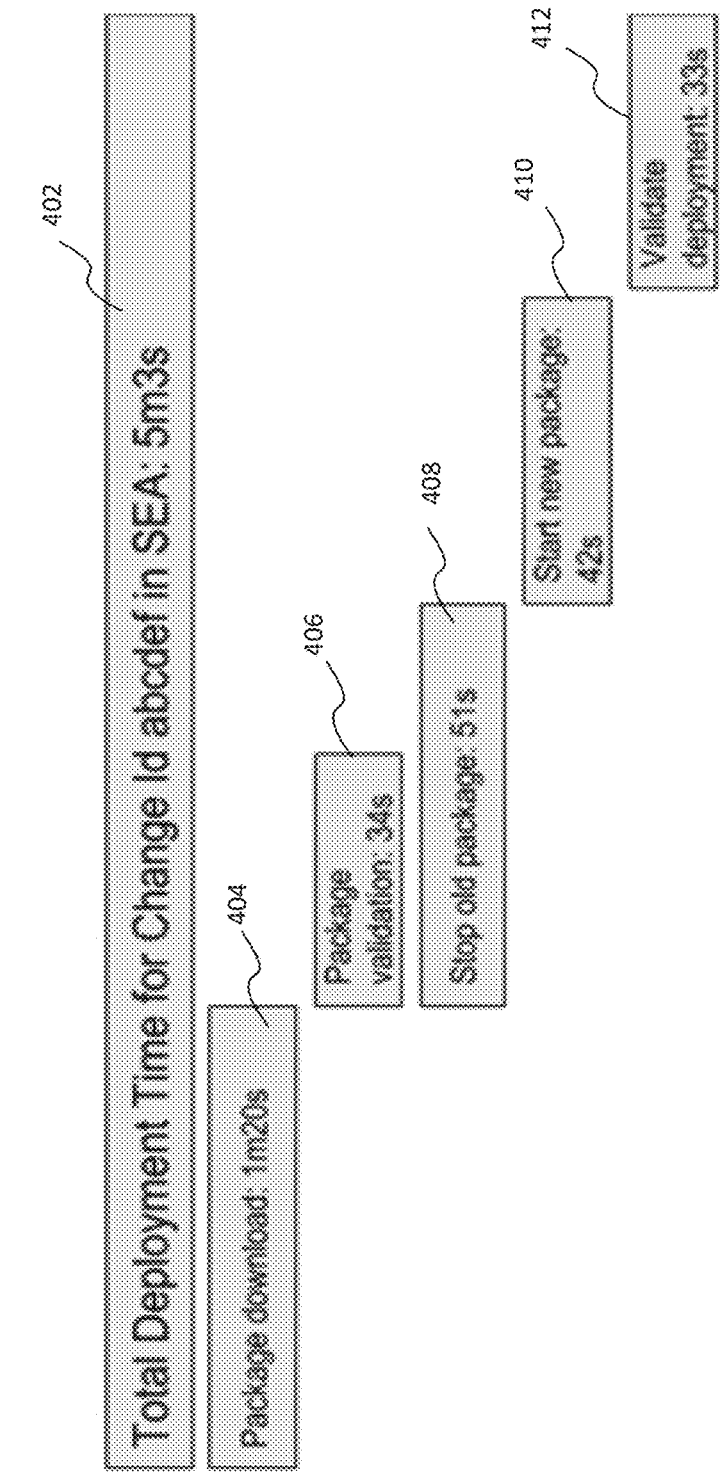

SYSTEMS AND METHODS OF INTEGRATED TESTING AND DEPLOYMENT IN A CONTINUOUS INTEGRATION CONTINUOUS DEPLOYMENT (CICD) SYSTEM

BACKGROUND

Present distributed tracing systems allow for a user to view visualizations of how programming components in a user's system communicate with each other. Such systems typically generate a "dependency map," which can be displayed in a graph-like structure having nodes and pathways. Typically, a failure is displayed in the tree structure dependency map as the tree's root node, and related contributing factors are displayed as leaf nodes. Such systems may show the logical relationship between error events in the tree. Other present systems merely provide a listing of each step of a tracing operation, and provide times indicating how long each operation took to complete. A user must review each step to determine whether there is a delay for one or more operations of the system, or a failure of an operation.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

FIGS. 1A-1C show a method of testing a code change for at least one phase of testing and visually highlighting the results of the testing according to an implementation of the disclosed subject matter.

FIG. 3B shows a display of a user interface that ranks change identifiers associated with a code change based on the test results according to an implementation of the disclosed subject matter.

FIG. 4 shows a detailed code trace timing display for a change identifier of a code change according to an implementation of the disclosed subject matter.

DETAILED DESCRIPTION

Figure 1B:
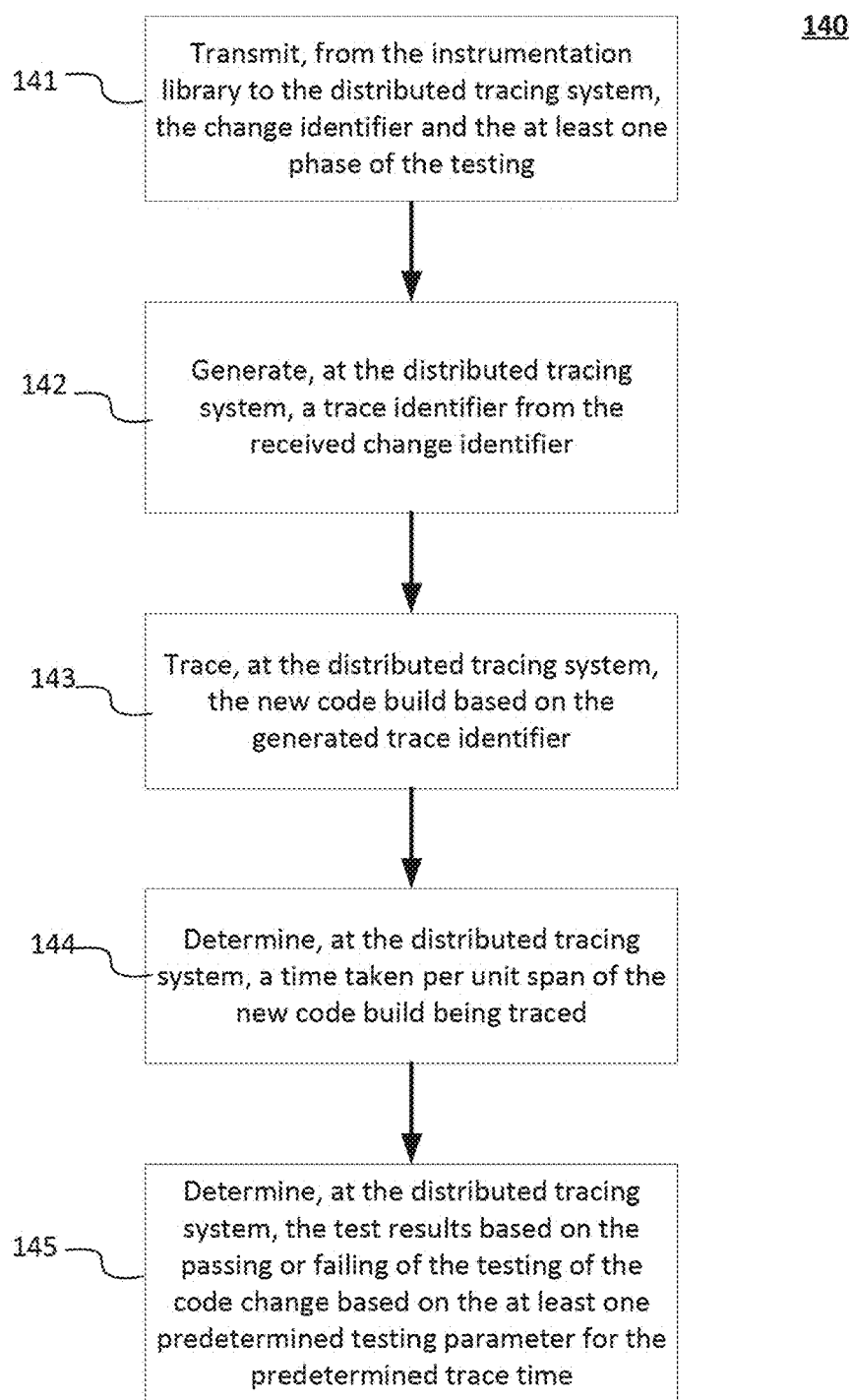

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure can be practiced without these specific details, or with other methods, components, materials, etc. In other instances, well-known structures and devices are shown in block diagram form to facilitate describing the subject disclosure.

Implementations of the disclosed subject matter include a continuous integration continuous deployment (CICD) server system that provides integrated code testing, version control, deployment, distributed tracing, and visualization of test results of code builds having one or more code changes. Change identifiers (Change IDs) may be generated to track code changes (e.g., new portions of code) that may be used to form a new code build. Instrumentation libraries and distributed tracing systems of the CICD server system may be used to provide different test phases (e.g., unit tests, integration tests, deployment tests, and the like) for the code changes and/or the new code build, and may be used to test and/or monitor the operation of the deployed new code build for one or more production environments (e.g., different data center locations and the like). The tests may be for one or more predetermined criteria (e.g., trace time or the like) to determine a pass/fail status. A user interface system may provide a visualization of a test result (e.g., pass/fail, timing, etc.) for each change identifier and each test phase, as well as for each production environment if the code has been deployed.

In some implementations, code to be changed can be identified using the systems and methods disclosed in the patent application entitled "Systems and Methods of Injecting Fault Tree Analysis Data into Distributed Tracing Visualizations," which was filed in the U.S. Patent and Trademark Office on Aug. 29, 2018 as application Ser. No. 16/115,801.

In some implementations, a rollback operation may be performed when a new code build that is deployed in one or more of the production environments fails a test. In some implementations, the rollback operation may be performed for when any operational failure of the CICD server system occurs. For example, a rollback operation may be performed when a failure of one or more hardware components of the CICD server system and/or a communications network failure is determined. A predetermined code may be used to restore operation of the code in the one or more production environments where the failure occurred.

The implementations of the disclosed subject matter provided herein may be used to test code updates for one or more test phases of a multi-tenant database system, and/or to monitor the operation of the code updates that are deployed in one or more production environments (e.g., one or more data center locations which may be located in different geographic regions). In some implementations, the code changes, new code builds, rollback operation code, code versions, and/or test results may be stored in a multi-tenant database system. For example, in such a multi-tenant database system, different developers may have access to one or more tenants to test code changes and new code builds, and/or deploy and monitor new code builds in production environments associated with a tenant.

Current distributed tracing systems may gather timing data needed to troubleshoot latency problems, where applications may report the timing data to such systems. Typically, the trace may be displayed as a list of operations, which may be difficult and time consuming for a user to determine where a failure occurred. Some systems may display a dependency diagram showing how many traced requests went through each application, and some systems may display a percentage of the total trace time each span takes. The systems and methods of the disclosed subject matter provide improvements over such present systems, as they provide for testing one or more code updates for unit tests, integration tests, deployment tests, as well as monitoring the operation of deployed code in multiple production environments (e.g., different datacenter locations). Moreover, the systems and method of the disclosed subject matter provide visual indications of the pass or failure of the tests or production environment operations for the one or more code changes across different production environments. With the implementations of the disclosed subject matter, developers may more easily determine which phase of testing or which production environments an error occurred with a particular code change, and may implement rollback code to one or more production environments so that such environments may be operational.

Other current systems provide fault tree analysis which may display representations of contributors to a failure (e.g., error events and propagations). In such systems, the failure being analyzed may be the displayed tree's root node, and related contributing factors may be displayed leaf nodes to the tree. Such systems may show the logical relationship between error events in the tree. This representation is limited to showing that a fault may depend on several failures. The CICD server systems of the disclosed subject matter differ from such fault tree systems in that a failure of the CICD server system does not cause a failure in the overall system. That is, with the CICD server system of the disclosed subject matter, components that are identified as having operational problems may be updated and tested. This differs from fault tree analysis, which is directed to determine which components of a system may cause failure, and assign probabilities of failure to the components of the system. That is, the systems and methods of the disclosed subject provide improvements over such present systems, as they provide for testing one or more code updates for unit tests, integration tests, deployment tests, as well as monitoring the operation of deployed code in multiple production environments (e.g., different datacenter locations). Moreover, the systems and method of the disclosed subject matter provide visual indications of the pass or failure of the tests or production environment operations for the one or more code changes across different production environments. Again, with the implementations of the disclosed subject matter, developers may more easily determine which phase of testing or which production environments an error occurred with a particular code change, and may implement rollback code to one or more production environments so that such environments may be operational.

Figure 1C:
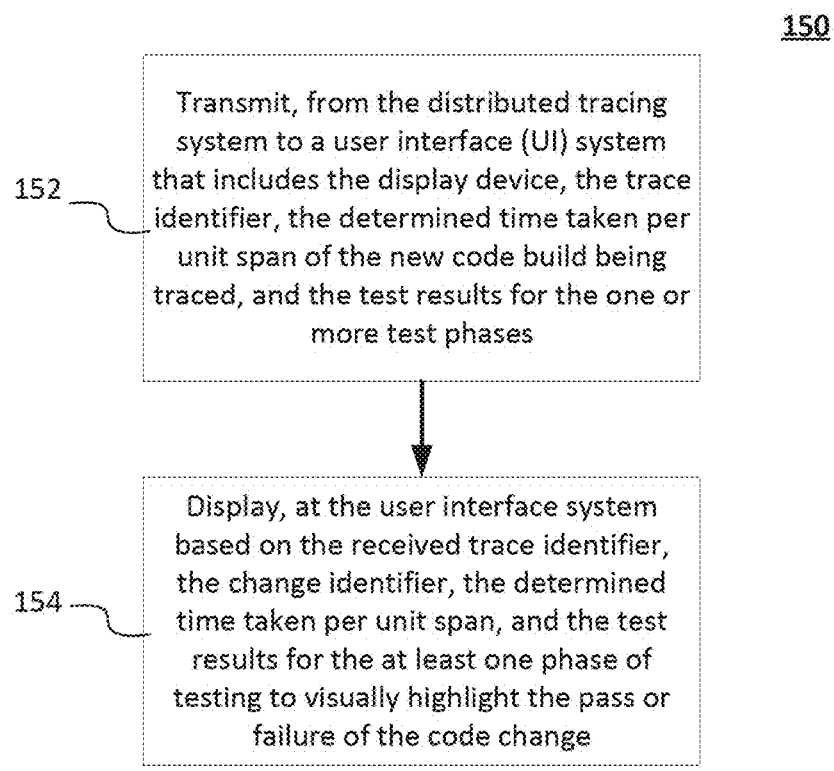

FIGS. 1A-1C show a method of testing a code change for at least one phase of testing and visually highlighting the results of the testing according to an implementation of the disclosed subject matter. FIG. 1A shows a method 100 of testing code changes and/or a new code build at a continuous integration and continuous deployment (CICD) server system, and displaying the results of the testing. At operation 110, a code change may be received at the CICD server system (e.g., system 500 shown in FIG. 5 and discussed below). For example, a developer may make one or more updates and/or changes to code. These code changes may be transmitted from the developer's computer (e.g., developer computer 502 shown in FIG. 5 and/or second computer 800 shown in FIG. 6, or the like) to the CICD server system 500.

At operation 120, the CICD server system 500 may generate a unique change identifier (e.g., change identifier 303, 304, 405, and/or 306 shown in FIG. 3A) for the received code change at a version control system (e.g., version control system 504 shown in FIG. 5 and discussed in detail below). The CICD server 500 may generate unique change identifiers for each received code change (e.g., change identifier 303, 304, 405, and/or 306 shown in FIG. 3A). For example, if a developer computer 502 transmits multiple code changes to the version control system 504 of the CICD system 500, the version control system 504 may generate separate change identifiers for each code change.

At operation 130, the continuous integration system (e.g., continuous integration system 506 shown in FIG. 5) may generate a new code build which includes the code change. In some implementations, when a plurality of code changes are received by the CICD server system, the version control system may generate and assign change identifiers for each of the plurality of code changes, and the version control system may generate a single new code build with the received plurality of code changes. In some implementations, one or more code changes may be integrated into different code builds.

At operation 140, the CICD server system may test the generated new code build by performing a code trace for at least one phase of the testing using an instrumentation library (e.g., instrumentation library 508 of the continuous integration system 506 shown in FIG. 5 and discussed in detail below) and distributed tracing system (e.g., distributed tracing system 514 shown in FIG. 5 and discussed below) of the CICD server system based on at least one predetermined testing parameter that includes a predetermined trace time for the code change of the generated change identifier. A test phase may include a unit test of the code change (e.g., unit test 310 shown in FIG. 3A), an integration test of the code change (e.g., integration test 320 shown in FIG. 3A), and/or a deployment test of the code change (e.g., deployment test 330 shown in FIG. 3A). For example, the unit test may test an individual code change before it is included in a new code build. The integration test may test the code change as part of the new code build. The deployment test may test the operation of the code change and/or new code build in a simulated deployment environment before deploying the new code build in a production environment. The details of the one or more phases of testing in operation 140 are discussed below in connection with FIG. 1B. The testing of new code builds for production environments are discussed below in connection with FIGS. 2A-2C.

The instrumentation library may automatically perform (e.g., without user intervention or the like) the code trace to determine the start and end times of the trace of the code change of the change identifier. At operation 150, a display device of a user interface system (e.g., user interface system 516 shown in FIG. 5 and/or display 620 shown in FIG. 6) of the CICD system may display test results for the change identifier for the at least one phase of testing to visually highlight a pass or failure of the testing for the code change based on the at least one predetermined testing parameter for the predetermined trace time. As discussed below in connection with FIG. 1A and FIG. 3A, a code change and/or new code build that passes a phase of testing may be highlighted in a first color (e.g., green), and a code change and/or new code build that fails a phase of testing may be highlighted in a second color (e.g., red) so that a developer and/or user may more easily identify problems with the code change and/or new code build.

FIG. 1B shows a more detailed view of method 140 (shown in FIG. 1A and described above) for testing the generated new code build by performing a code trace for at least one phase of the testing according to an implementation of the disclosed subject matter. At operation 141, the change identifier and the at least one phase of the testing may be transmitted from the instrumentation library (e.g., instrumentation library 508 shown in FIG. 5) to the distributed tracing system (e.g., the distributed tracing system 514 shown in FIG. 5). At operation 142, the distributed tracing system may generate a trace identifier from the received change identifier. The trace identifier may be used for the purposes of a trace for one phase of testing. That is, a code change that is associated with a change identifier may have one or more trace identifiers, depending on the phase of testing. For example, a different trace identifier may be generated for the same change identifier for each phase of testing (e.g., different trace identifiers may be generated for the unit test, integration test, and/or deployment test). This assignment of trace identifiers may allow for a user or developer to track the traces of code during one or more phases of testing.

At operation 143, the distributed tracing system may trace the new code build based on the generated trace identifier. At operation 144, the distributed tracing system may determine a time taken per unit span of the new code build being traced. At operation 145, the distributed tracing system may determine the test results based on the passing or failing of the testing of the code change based on the at least one predetermined testing parameter for the predetermined trace time. The test results may be output to display 300 of the user interface, as discussed below in connection with FIG. 3A, and a ranking of the results may be shown in display 360 of FIG. 3B and discussed below.

Figure 3A:
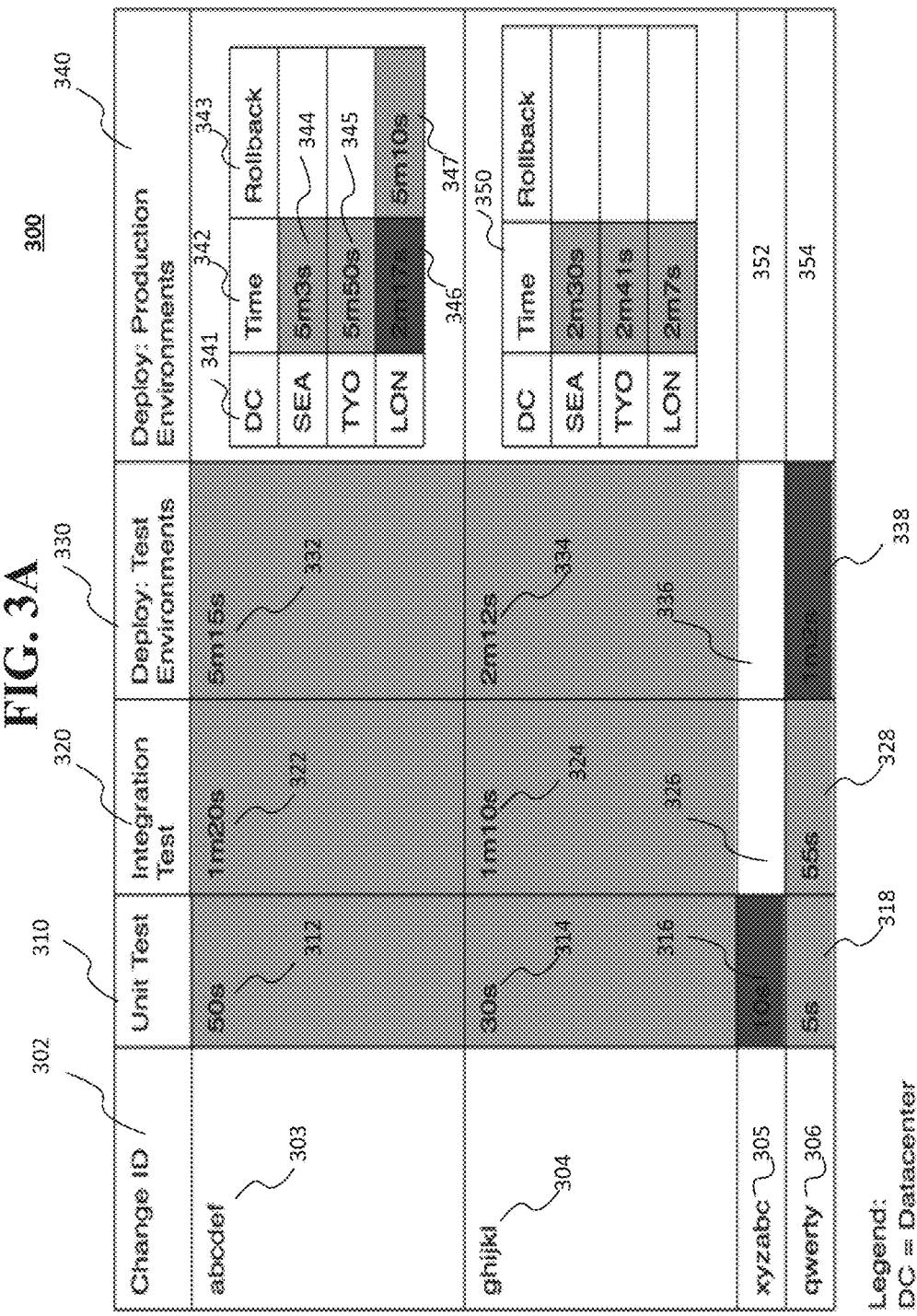
FIG. 3A shows a display of a user interface that provides test results for different test phases and deployment environments for each change identifier representing a code change according to an implementation of the disclosed subject matter.

FIG. 1C shows a more detailed view of method 150 (shown in FIG. 1A) of display test results for the change identifier for the at least one phase of testing to visually highlight a pass or failure of the testing for the code change based on the at least one predetermined testing parameter for the predetermined trace time according to an implementation of the disclosed subject matter. At operation 152, the trace identifier, the determined time taken per unit span of the new code build being traced, and the test results for the one or more test phases may be transmitted from the distributed tracing system to a user interface (UI) system (e.g., user interface system 516 shown in FIG. 5) that includes the display device. At operation 154, the change identifier, the determined time taken per unit span, and the test results for the at least one phase of testing to visually highlight the pass or failure of the code change may be displayed at the user interface system based on the received trace identifier. An example of the user interface display (e.g. display 300 and/or display 360) is shown in FIGS. 3A-3B and discussed below. In some implementations, a ranking of one or more components of the tested new code build based on the test results on the display device may be displayed (e.g., in display 360 shown in FIG. 3B).

Figure 2A:
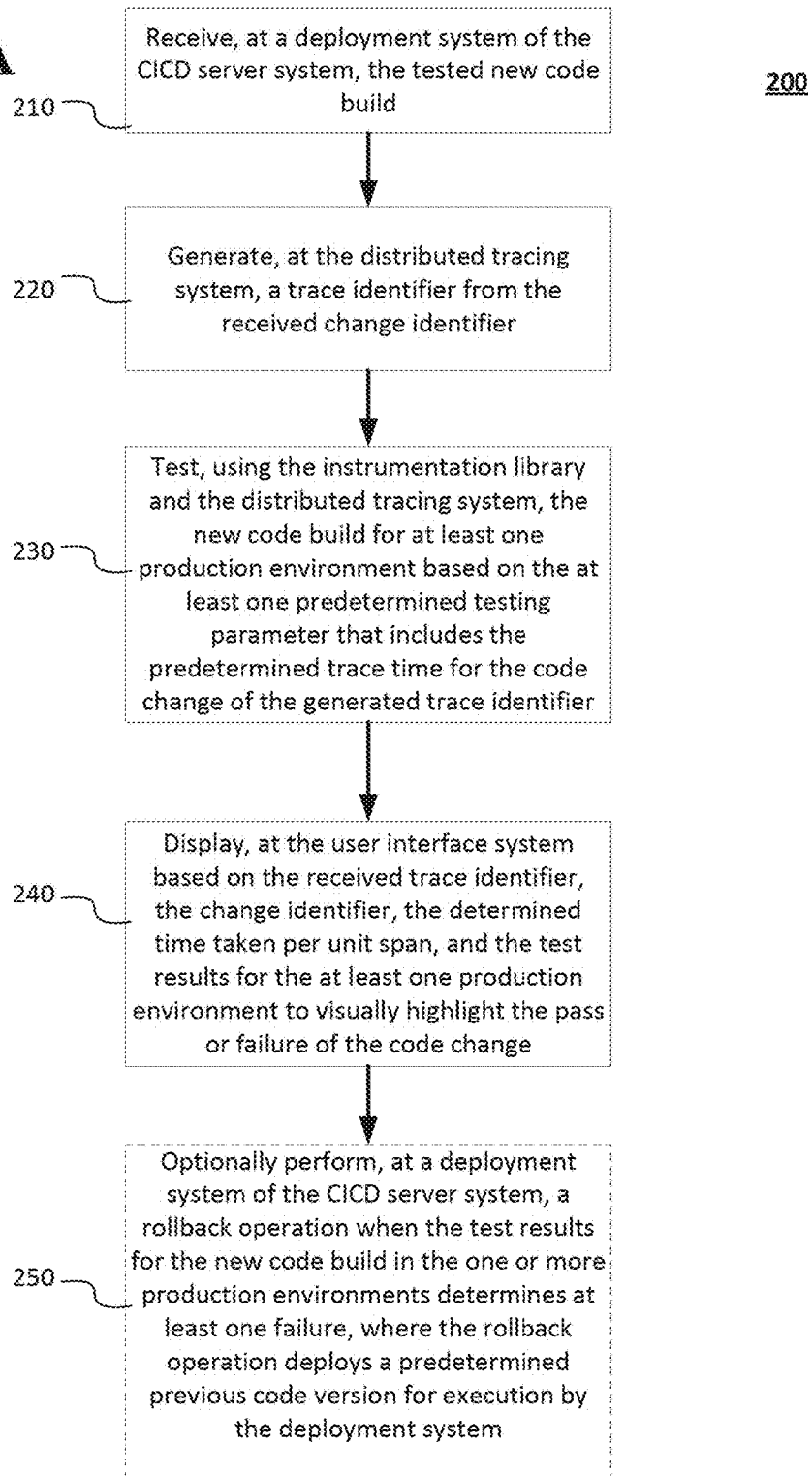
FIGS. 2A-2C show a method of testing a code change for at least one production environment and visually highlighting the results of the testing according to an implementation of the disclosed subject matter.
Figure 2B:
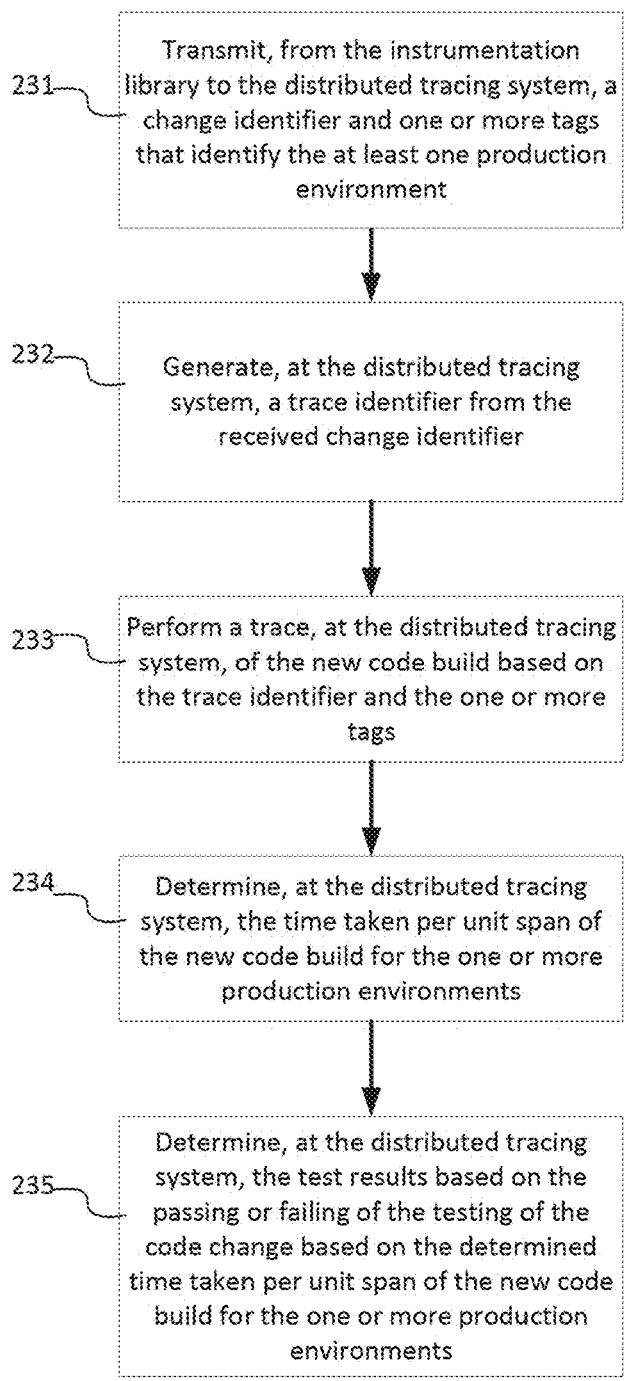
Figure 2C:
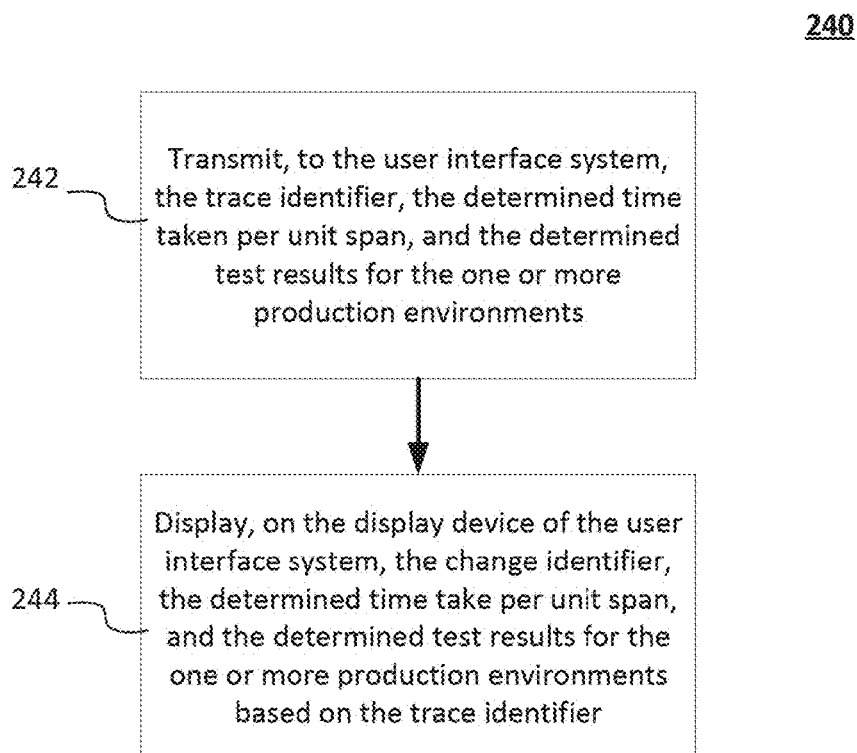

FIGS. 2A-2C show a method 200 of testing a code change and/or new code build for at least one production environment and visually highlighting the results of the testing according to an implementation of the disclosed subject matter. The at least one production environment may be one or more datacenters (e.g., which may be in different geographical locations) in which the new code build may be deployed. The results of the code change and/or new code build testing for the at least one production environment may be displayed on display 300 as production environment test 340 shown in FIG. 3A and described below. The results of the testing may be used to rank the code changes and/or new code build as shown in display 360 shown in FIG. 3B.

At operation 210 shown in FIG. 2A, a deployment system (e.g., deployment system 510 shown in FIG. 5) of the CICD server system (e.g., CICD server system 500) may receive the tested new code build. In some implementations, the deployment system 510 may receive the tested new code build from the continuous integration system 506, which may have used the instrumentation library 508 to test the new code build for one or more test phases. A new code build and/or code changes that pass the different test phases may be provided to the deployment system 510 for deployment and testing.

At operation 220, the distributed tracing system may generate a trace identifier based on the received change identifier. Similar to operation 142 of FIG. 1B, operation 220 may generate a trace identifier for the change identifier for each production environment test. In some implementations, a trace identifier may be generated for the same change identifier for each production environment test so as to monitor and track testing of the new code build.

Figure 5:
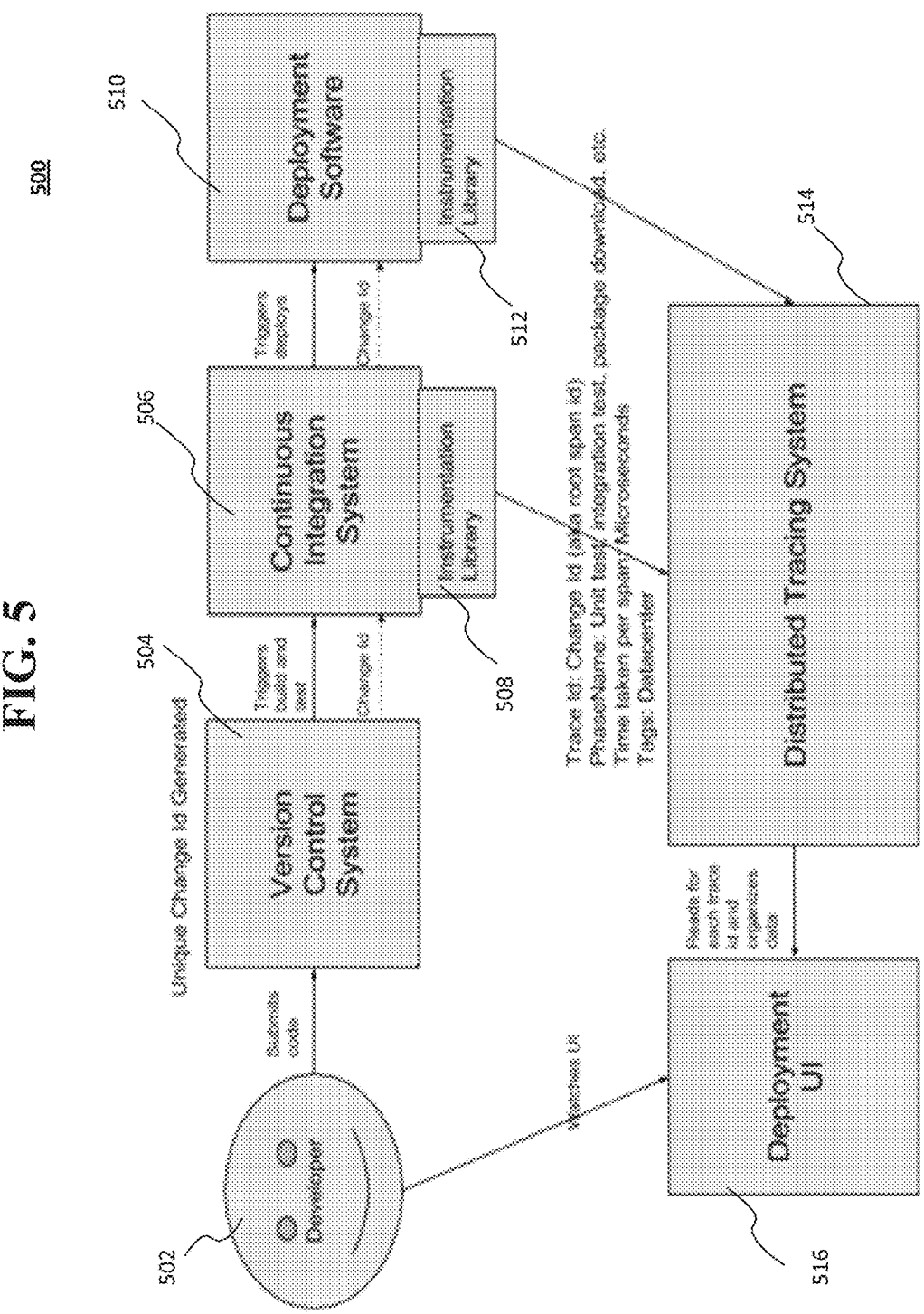
FIG. 5 shows a continuous integration and continuous deployment server system according to an implementation of the disclosed subject matter.

At operation 230, the new code build may be tested for at least one production environment based on the at least one predetermined testing parameter that includes the predetermined trace time for the code change of the generated trace identifier using the instrumentation library (e.g., instrumentation library 512 shown in FIG. 5) and the distributed tracing system (e.g., distributed tracing system 514 shown in FIG. 5). The details of the testing operation 230 are discussed below in connection with FIG. 2B.

At operation 240, the user interface system (e.g., the user interface system 516 shown in FIG. 5) may display, based on the received trace identifier, the change identifier, the determined time taken per unit span, and the test results for the at least one production environment to visually highlight the pass or failure of the code change (e.g., production environment test 340 shown in FIG. 3A). The details of the operation 240 are discussed below in connection with FIG. 2C.

Optionally, operation 250 of FIG. 2A may perform a rollback operation when the test results for the new code build in the one or more production environments determines at least one failure using a deployment system (e.g., the deployment system 510 shown in FIG. 5) of the CICD server system. In some implementations, operation 250 may perform the rollback operation for any failure (e.g., hardware failure, network failure, or the like) that is determined by the CICD server system. The rollback operation (e.g., operation 250) may deploy a predetermined previous code version for execution by the deployment system.

FIG. 2B shows a more detailed view of method 230 (shown in FIG. 2A and described above) for testing the generated new code build by performing a code trace for at least one production environment of the testing according to an implementation of the disclosed subject matter. At operation 231, a change identifier and one or more tags that identify the at least one production environment may be transmitted from the instrumentation library (e.g., instrumentation library 512 shown in FIG. 5) to the distributed tracing system (e.g., distributed tracing system 514 shown in FIG. 5). At operation 232, the distributed tracing system may generate a trace identifier from the received change identifier.

At operation 233 of FIG. 2B, the distributed tracing system may perform a trace of the new code build based on the trace identifier and the one or more tags. At operation 234, the distributed tracing system may determine the time taken per unit span of the new code build for the one or more production environments. At operation 235, the distributed tracing system may determine the test results based on the passing or failing of the testing of the code change based on the determined time taken per unit span of the new code build for the one or more production environments.

FIG. 2C shows a more detailed view of method 240 (shown in FIG. 2A) for displaying the change identifier, the determined time taken per unit span, and the test results for the at least one production environment to visually highlight the pass or failure of the code change according to an implementation of the disclosed subject matter. At operation 242, the trace identifier, the determined time taken per unit span, and the determined test results for the one or more production environments may be transmitted to the user interface system (e.g., user interface system 516 shown in FIG. 5). At operation 244, the display device of the user interface system may display the change identifier, the determined time take per unit span, and the determined test results for the one or more production environments based on the trace identifier, such as par of production environment tests 340 of display 300 shown in FIG. 3A and discussed below.

FIG. 3A shows a display 300 showing test results for different test phases and deployment environments for each change identifier representing a code change and/or new code build according to an implementation of the disclosed subject matter. The display 300 may be displayed on a display device of the user interface 516 shown in FIG. 5. The display 300 may include a column display for the change identifier (change ID) 302. For example, as shown in display 300, the new code build may have four new code segments, each of which may be assigned a change identifier. That is, in the change identifier column 302 may include change identifier 303 (e.g., "abcdef") that may be assigned to a first new code segment, change identifier 304 (e.g., "ghijkl") that may be assigned to a second new code segment, change identifier 305 (e.g., "xyzabc") that may be assigned to a third new code segment, and change identifier 306 (e.g., "qwerty") that may be assigned to a fourth new code segment.

The display 300 may include the test results for a unit test 310, an integration test 320, and/or a deployment test 330, and the like. These tests may be part of the at least one phase test of method 100 shown in FIGS. 1A-1C and described above. The unit test 310 may display the test results of a code change for a change identifier (e.g., before it is included in a new code build). The integration test 320 may display the test results for the code change as part of the new code build. The deployment test 330 may display the test results for the code change as part of a new code build, and its operation in a simulated deployment environment before deploying the new code build in a production environment.

For example, testing of the code change having the change identifier 303 ("abcdef") may have a trace time 312 (e.g., 50 seconds), which may be less that a predetermined trace time. In some implementations, the trace time 312 for the change identifier 303 may be highlighted in a green color, or other suitable color, indicating that the trace time 312 is less than or equal to a predetermined trace time for the unit test 310. Similarly, unit test 310 may be displayed for change identifiers 304, 305, and/or 306. In the example shown in display 300, the trace time 314 for change identifier 304 and the trace time 318 for change identifier 306 may pass the unit test 310, and may be highlighted to indicate that the unit test 310 has been passed. The trace time 316 for change identifier 305 may have a trace time that is greater that a predetermined trace time, and the display 300 may highlight the failure of the unit test 310. In some implementations, a test failure, such as the failure of unit test 310 by the code change having the change identifier 305, may be highlighted to indicate the failure, such as by using a red color.

The integration test 320 column of display 300 may show the test results for the change identifiers 303, 304, 305, and/or 306. In the example shown in display 300, the change identifiers 303, 304 and 306 may be highlighted so as to indicate that the integration test 320 has been passed (e.g., with a green color). For change identifier 305, no result is provided for the integration test 320, as the code change associated with change identifier 305 has not passed the previous test phase (i.e., the unit test 310).

The deployment test 330 column of display 300 may show the test results for the change identifiers 303, 304, 305, and/or 306. In the example shown in display 300, the change identifiers 303 and 304 may be highlighted so as to indicate that the deployment test 330 has been passed (e.g., with a green color). No result is provided for the integration test 320 for change identifier 305, as the code change associated with change identifier 305 has not passed the unit test 310. For change identifier 306, the display 300 has highlighted the deployment test result 338 as a failure, as the code change associated with the change identifier 306 may have trace time that is greater that a predetermined trace time. In some implementations, a test failure, such as the failure of unit test 330 by the code change having the change identifier 306, may be highlighted to indicate the failure, such as by using a red color.

The production environment test 340 column of display 300 may provide test results for different datacenters. The datacenters may be located in different geographical locations, such as, for example, Seattle, Tokyo, London, and the like. Time 342 column for production environment test 340 for the change identifier 303 may provide the test results for a trace time 344 for a first datacenter location (e.g., Seattle, or "SEA"), a trace time 345 for a second datacenter location (e.g., Tokyo, or "TYO"), and/or a trace time 346 (e.g., London, or "LON"). As shown in display 300, the trace times 344 and 345 for the "SEA" and "TYO" production environments may pass the production environment test 340 by having a trace time that is less than or equal to a predetermined trace time.

The trace time 346 for the "LON" production environment may fail the production environment test, as it may have a trace time that is greater than the predetermined trace time for this code change having the change identifier 303. Trace time 346 may be highlighted (e.g., in a red color) to indicate the failure of the production environment test 340. In some implementations, a rollback operation may be performed (e.g., as described above in connection with operation 250 shown in FIG. 2A) when a test failure and/or other failure of the CICD server system is determined. The CICD server system 500 may use predetermined rollback code in the production environment for the "LON" datacenter to restore operation, and the production environment test 340 may be conducted for the rollback code. Trace time 347 for rollback test 343 may indicate that the rollback code for the change identifier 303 may pass, as it may have a rollback trace time that is less than or equal to a predetermined trace time. In some implementations, the pass result may be highlighted in a green color.

The production environment test 340 may be conducted for the new code build that includes the code change associated with the change identifier 304. As shown in display 300, the test results 350 for the production environment test 340 may indicate that the test may be passed for each of the different datacenters (e.g., "SEA," "TYO," and "LON"). As the code changes associated with the change identifiers 305 and 306 have not passed all of the test phases (e.g., unit test 310, integration test 320, and deployment test 330), the results 352 and 354 for the production environment test 340 may not appear.

FIG. 3B shows a display 360 which may be a ranking of the code changes by change identifier by the CICD server system 500. In some implementations, the CICD server system may determine ranking by the number of phases of testing and/or production environments that a code change and/or new code build has passed. As change identifier "ghijkl" may pass the unit test 310, integration test 320, and deployment test 330, as well as passed the production environment test 340 without using a rollback operation, this change identifier may be ranked first. As change identifier "abcdef" may pass the unit test 310, integration test 320, and deployment test 330, as well as passed the production environment test 340, but utilized a rollback operation, this change identifier may be ranked second. As change identifier "qwerty" may pass the unit test 310 and the integration test 320, but may have failed the deployment test 330, this change identifier may be ranked third. As change identifier "xyzabc" may have failed the unit test 310, this change identifier may be ranked fourth.

In some implementations, the ranking of the code changes by change identifier by the CICD server system 500 may be based on who is viewing the ranking. For example, a developer may view the ranking of code changes that the developer has worked on to determine their performance. In another example, a development manager may view ranking of code changes that have been submitted by different developers to determine the performance of the code changes by each of the different developers. That is, the development manager may determine which of the code changes is taking the longest to be deployed in a production environment.

FIG. 4 shows a detailed code trace timing display 400 for a change identifier of a code change according to an implementation of the disclosed subject matter. Display 400 may be displayed on a display device of the user interface 516 shown in FIG. 5. Display 400 may be displayed when a user of the CICD system 500 selects the trace time 344 of the production environment test 340 for the Seattle ("SEA") datacenter location to view timing information for one or more parts of the production environment test 340. In some implementations, some of the operations shown in display 400 may occur in parallel with one another.

As shown by the trace time 344 of FIG. 3A and the total deployment time 402 shown in FIG. 4, the total trace time for the deployment of the code change associated with the change identifier is 5 minutes and 3 seconds. As shown in display 400, the total deployment time 402 may include a package download time 404 which may be 1 minute and 20 seconds. This time may be amount of time to download the code change and/or the new code build associated with the change identifier 303. A package validation time 406 may be 34 seconds. This may be the amount of time to validate the origin, authenticity, sender, or the like of code change and/or the new code build associated with the change identifier 303.

A stop old package time 408 may be displayed on display 400, which may be 51 seconds. This time may be the amount of time to stop the operation of the current code build operating in the production environment (e.g., the code build operating in the Seattle datacenter). A start new package time 410 may display the amount of time to start the code change and/or the new code build that was downloaded at operation 404 for a production environment for a datacenter, which, in this example, may be 42 seconds. Display 400 may include a validate deployment time 412, which may be 33 seconds. This time may be to validate that the code change and/or the new code build has been deployed and is operational for a particular production environment (e.g., the Seattle datacenter).

Display 400 may show the interrelation and/or dependencies between particular events, and their trace times. That is, the display 400 may show the interrelation and/or dependencies between the packages and trace times for the package download time 404, the package validation time 406, the stop old package time 408, the start new package time 410, and/or the validate deployment time 412.

FIG. 5 shows a continuous integration and continuous deployment (CICD) server system 500 according to an implementation of the disclosed subject matter. For example, the CICD system 500 can be implemented on a laptop, a desktop, an individual server, a server cluster, a server farm, or a distributed server system, or can be implemented as a virtual computing device or system, or any suitable combination of physical and virtual systems. For simplicity, various parts such as the processor, the operating system, and other components of the CICD server system 500 are not shown. CICD server system 500 may include one or more servers, and may include one or more digital storage devices communicatively coupled thereto, for the version control system 504, the continuous integration system 506, the instrumentation libraries 508 and 512, the deployment system 510, the distributed tracing system 514, and the user interface system 516.

Developer computer 502 may be a desktop computer, a laptop computer, a server, a tablet computing device, a wearable computing device, or the like. In some implementations, the developer computer may be separate from CICD server system 500, and may be communicatively coupled to the CICD server system 500 via a wired and/or wireless communications network. Developer computer 502 may provide one or more code changes to the version control system 504.

The continuous integration system 506 may perform a new code build using the code change provided by the developer computer 502, and may generate a change identifier for each code change segment. The continuous integration system 506 may manage the new code build, and the testing of the new code build. The version control system 504 may store one or more versions of code built by the continuous integration system 506. For example, the version control system may store the versions of code in storage 810 of second computer 800 shown in FIG. 6, and/or in one or more of the database systems 1200a-1200d shown in FIG. 7.

The instrumentation library 508 may manage the at least one phase of testing of the new code build, which may include the unit test 310, integration test 320, and/or the deployment test 330 shown in FIG. 3A and described above, and as also described and shown in connection with FIGS. 1A-1C. The deployment system 510 may manage the deployment of the new code build that has been tested for the at least on test phase to at least one production environment (e.g., one or more datacenters that may be located at different geographic locations). The instrumentation library 512 may manage the testing and/or monitoring of the deployed new code build. In some implementations, the continuous integration system 506 may manage a rollback operation when it is determined that changed code and/or the deployed new code build fails a production environment test (e.g., based on information that may be received from the instrumentation libraries 508, as described above in connection with the rollback operation 250 shown in FIG. 2A and rollback 343 shown in FIG. 3A). In some implementations, the continuous integration system 506 may manage a rollback operation when any failure of the CICD server system is determined (e.g., hardware failure, network failure, or the like).

The distributed tracing system 514 may determine timing information for one or more operations and/or records, which may be used to perform a trace operation for a code change and/or new code build for at least one phase of testing and/or deployment testing. The user interface system 516 may display the results of the at least one phase of testing and the deployment testing. The user interface system 516 may be monitored and/or be accessible to the developer computer 502.

Figure 6:
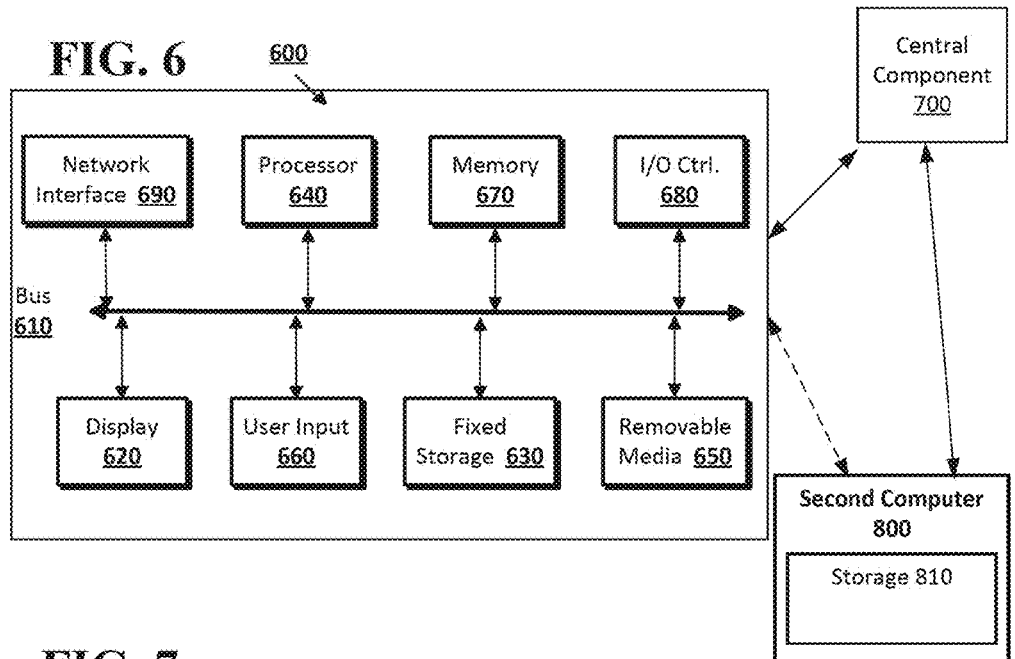
FIG. 6 shows a computer system according to an implementation of the disclosed subject matter.

Implementations of the presently disclosed subject matter may be implemented in and used with a variety of component and network architectures. FIG. 6 is an example computer 600 suitable for implementing implementations of the presently disclosed subject matter. As discussed in further detail herein, the computer 600 may be a single computer in a network of multiple computers. As shown in FIG. 6, the computer 600 may communicate with a central or distributed component 700 (e.g., server, cloud server, database, cluster, application server, etc.). The central component 700 may communicate with one or more other computers such as the second computer 800, which may include a storage device 810. The second computer 800 may be a server, cloud server, or the like. The storage 810 may use any suitable combination of any suitable volatile and non-volatile physical storage mediums, including, for example, hard disk drives, solid state drives, optical media, flash memory, tape drives, registers, and random access memory, or the like, or any combination thereof.

In some implementations, the developer computer 502 shown in FIG. 5 may be the computer 600, and the version control system 504, continuous integration system 506, instrumentation libraries 508 and 512, the deployment system 510, the distributed tracing system 514 and the user interface system 516 may be at least part of the central component 700 and/or the second computer 800. In some implementations, the CICD server system 500 shown in FIG. 5 may be implemented on one or more of the computer 600, the central component 700, and/or the second computer 800.

Figure 7:
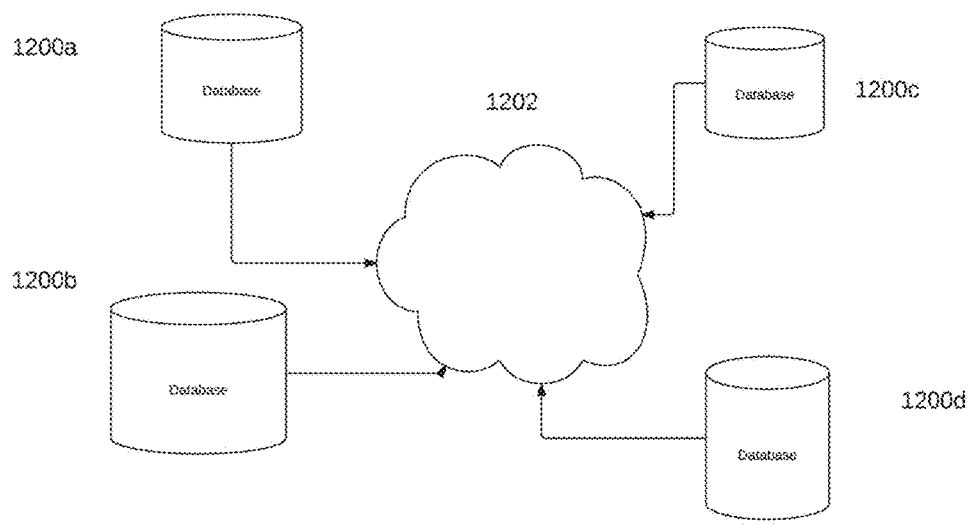
FIG. 7 show a network configuration according to an implementation of the disclosed subject matter.

Data for the CICD server system 500 may be stored in any suitable format in, for example, the storage 810, using any suitable filesystem or storage scheme or hierarchy. The stored data may be, for example, the changed code, the new code build, one or more previous code builds, code for rollback operations, test result data, and the like. For example, the storage 810 can store data using a log structured merge (LSM) tree with multiple levels. Further, if the systems shown in FIGS. 6-7 are multitenant systems, the storage can be organized into separate log structured merge trees for each instance of a database for a tenant. For example, multitenant systems may be used to manage a plurality of developers and/or code bases for version control and/or deployment. Alternatively, contents of all records on a particular server or system can be stored within a single log structured merge tree, in which case unique tenant identifiers associated with versions of records can be used to distinguish between data for each tenant as disclosed herein. More recent transactions (e.g., code updates, new code builds, rollback code, test result data, and the like) can be stored at the highest or top level of the tree and older transactions can be stored at lower levels of the tree. Alternatively, the most recent transaction or version for each record (i.e., contents of each record) can be stored at the highest level of the tree and prior versions or prior transactions at lower levels of the tree.

The information obtained to and/or from a central component 700 can be isolated for each computer such that computer 600 cannot share information with computer 800 (e.g., for security and/or testing purposes). Alternatively, or in addition, computer 600 can communicate directly with the second computer 800.

The computer (e.g., user computer, enterprise computer, etc.) 600 may include a bus 610 which interconnects major components of the computer 600, such as a central processor 640, a memory 670 (typically RAM, but which can also include ROM, flash RAM, or the like), an input/output controller 680, a user display 620, such as a display or touch screen via a display adapter, a user input interface 660, which may include one or more controllers and associated user input or devices such as a keyboard, mouse, Wi-Fi/cellular radios, touchscreen, microphone/speakers and the like, and may be communicatively coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 may enable data communication between the central processor 640 and the memory 670, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 600 may be stored on and accessed via a computer readable medium, such as a hard disk drive (e.g., fixed storage 630), an optical drive, floppy disk, or other storage medium 650.

The fixed storage 630 can be integral with the computer 600 or can be separate and accessed through other interfaces. The fixed storage 630 may be part of a storage area network (SAN). A network interface 690 can provide a direct connection to a remote server via a telephone link, to the Internet via an internet service provider (ISP), or a direct connection to a remote server via a direct network link to the Internet via a POP (point of presence) or other technique. The network interface 690 can provide such connection using wireless techniques, including digital cellular telephone connection, Cellular Digital Packet Data (CDPD) connection, digital satellite data connection or the like. For example, the network interface 690 may enable the computer to communicate with other computers and/or storage devices via one or more local, wide-area, or other networks, as shown in FIGS. 5-7.

Many other devices or components (not shown) may be connected in a similar manner (e.g., the CICD server system 500 shown in FIG. 5, data cache systems, application servers, communication network switches, firewall devices, authentication and/or authorization servers, computer and/or network security systems, and the like). Conversely, all the components shown in FIGS. 6-7 need not be present to practice the present disclosure. The components can be interconnected in different ways from that shown. Code to implement the present disclosure (e.g., for the CICD server system 500 and the like) can be stored in computer-readable storage media such as one or more of the memory 670, fixed storage 630, removable media 650, or on a remote storage location.

FIG. 7 shows an example network arrangement according to an implementation of the disclosed subject matter. Four separate database systems 1200a-d at different nodes in the network represented by cloud 1202 communicate with each other through networking links 1204 and with users (not shown). The database systems 1200a-d may be, for example, different production environments of the CICD server system 500 that code changes may be tested for and that may deploy new code builds. In some implementations, the one or more of the database systems 1200a-d may be located in different geographic locations. Each of database systems 1200 can be operable to host multiple instances of a database (e.g., that may store code changes, new code builds, rollback code, testing data, and the like), where each instance is accessible only to users associated with a particular tenant. Each of the database systems can constitute a cluster of computers along with a storage area network (not shown), load balancers and backup servers along with firewalls, other security systems, and authentication systems. Some of the instances at any of systems 1200 may be live or production instances processing and committing transactions received from users and/or developers, and/or from computing elements (not shown) for receiving and providing data for storage in the instances.

One or more of the database systems 1200a-d may include at least one storage device, such as in FIG. 6. For example, the storage can include memory 670, fixed storage 630, removable media 650, and/or a storage device included with the central component 700 and/or the second computer 800. The tenant can have tenant data stored in an immutable storage of the at least one storage device associated with a tenant identifier.

In some implementations, the one or more servers shown in FIGS. 6-7 can store the data (e.g., code changes, new code builds, rollback code, test results and the like) in the immutable storage of the at least one storage device (e.g., a storage device associated with central component 700, the second computer 800, and/or the database systems 1200a-1200d) using a log-structured merge tree data structure.

The systems and methods of the disclosed subject matter can be for single tenancy and/or multitenancy systems. Multitenancy systems can allow various tenants, which can be, for example, developers, users, groups of users, or organizations, to access their own records (e.g., code changes, new code builds, code build versions, test results, and the like) on the server system through software tools or instances on the server system that can be shared among the various tenants. The contents of records for each tenant can be part of a database containing that tenant. Contents of records for multiple tenants can all be stored together within the same database, but each tenant can only be able to access contents of records which belong to, or were created by, that tenant. This may allow a database system to enable multi-tenancy without having to store each tenants' contents of records separately, for example, on separate servers or server systems. The database for a tenant can be, for example, a relational database, hierarchical database, or any other suitable database type. All records stored on the server system can be stored in any suitable structure, including, for example, an LSM tree.

Further, a multitenant system can have various tenant instances on server systems distributed throughout a network with a computing system at each node. The live or production database instance of each tenant may have its transactions processed at one computer system. The computing system for processing the transactions of that instance may also process transactions of other instances for other tenants.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "transmitting," "modifying," "sending," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

What is claimed is:

1. A method comprising:
receiving a code change at a continuous integration and continuous deployment (CICD) server system;
generating a unique change identifier for the received code change at a version control system of the CICD server system;
generating, at a continuous integration system of the CICD server system, a new code build which includes the code change;
testing, at the CICD server system, the generated new code build by performing a code trace for at least one phase of the testing using an instrumentation library and distributed tracing system of the CICD server system based on at least one predetermined testing parameter that includes a predetermined trace time for the code change of the generated change identifier, wherein the instrumentation library automatically performs the code trace to determine the start and end times of the trace of the code change of the change identifier; and
displaying, on a display device coupled to the CICD system, test results for the change identifier for the at least one phase of testing to visually highlight a pass or failure of the testing for the code change based on the at least one predetermined testing parameter for the predetermined trace time.

2. The method of claim 1, further comprising:
transmitting, from the instrumentation library to the distributed tracing system, the change identifier and the at least one phase of the testing;
generating, at the distributed tracing system, a trace identifier from the received change identifier;
tracing, at the distributed tracing system, the new code build based on the generated trace identifier;
determining, at the distributed tracing system, a time taken per unit span of the new code build being traced; and
determining, at the distributed tracing system, the test results based on the passing or failing of the testing of the code change based on the at least one predetermined testing parameter for the predetermined trace time.

3. The method of claim 2, further comprising:
transmitting, from the distributed tracing system to a user interface (UI) system that includes the display device, the trace identifier, the determined time taken per unit span of the new code build being traced, and the test results for the one or more test phases,
wherein the displaying comprises:
displaying, at the user interface system based on the received trace identifier, the change identifier, the determined time taken per unit span, and the test results for the at least one phase of testing to visually highlight the pass or failure of the code change.

4. The method of claim 1, further comprising:
receiving, at a deployment system of the CICD server system, the tested new code build;
generating, at the distributed tracing system, a trace identifier from the received change identifier; and
testing, using the instrumentation library and the distributed tracing system, the new code build for at least one production environment based on the at least one predetermined testing parameter that includes the predetermined trace time for the code change of the generated trace identifier;
wherein the displaying comprises:
displaying, at the user interface system based on the received trace identifier, the change identifier, the determined time taken per unit span, and the test results for the at least one production environment to visually highlight the pass or failure of the code change.

5. The method of claim 4, further comprising:
performing, at a deployment system of the CICD server system, a rollback operation when the test results for the new code build in the one or more production environments determines at least one failure,
wherein the rollback operation deploys a predetermined previous code version for execution by the deployment system.

6. The method of claim 4, further comprising:
transmitting, from the instrumentation library to the distributed tracing system, a change identifier and one or more tags that identify the at least one production environment;
generating, at the distributed tracing system, a trace identifier from the received change identifier;
performing a trace, at the distributed tracing system, of the new code build based on the trace identifier and the one or more tags;
determining, at the distributed tracing system, the time taken per unit span of the new code build for the one or more production environments; and
determining, at the distributed tracing system, the test results based on the passing or failing of the testing of the code change based on the determined time taken per unit span of the new code build for the one or more production environments.

7. The method of claim 6, further comprising:
transmitting, to the user interface system, the trace identifier, the determined time taken per unit span, and the determined test results for the one or more production environments,
wherein the displaying comprises:
displaying, on the display device of the user interface system, the change identifier, the determined time take per unit span, and the determined test results for the one or more production environments based on the trace identifier.

8. The method of claim 1, further comprising:
displaying, on the display device of the user interface system, a ranking of one or more components of the tested new code build based on the test results.

9. A system comprising:
a continuous integration and continuous deployment (CICD) server system to receive a code change, the CICD server system comprising:
  a version control system to generate a unique change identifier for the received code change; and
  a continuous integration system to generate a new code build which included the code change,
wherein the CICD server system tests the generated new code build by performing a code trace for at least one phase of the testing using an instrumentation library and distributed tracing system of the CICD server system based on at least one predetermined testing parameter that includes a predetermined trace time for the code change of the generated change identifier, wherein the instrumentation library automatically performs the code trace to determine the start and end times of the trace of the code change of the change identifier, and
a display device coupled to the CICD system, to display test results for the change identifier for that at least one phase of testing to visually highlight a pass or failure of the testing for the code change based on the at least one predetermined testing parameter for the predetermined trace time.

10. The system of claim 9, wherein the instrumentation library transmits the change identifier and the at least one phase of the testing to the distributed tracing system,
wherein the distributed tracing system generates a trace identifier from the received change identifier, traces the new code build based on the generated trace identifier, determines a time taken per unit span of the new code build being traced, and determines the test results based on the passing or failing of the testing of the code change based on the at least one predetermined testing parameter for the predetermined trace time.

11. The system of claim 10, further comprising:
a user interface (UI) system that includes the display device,
wherein the distributed tracing system the trace identifier, the determined time taken per unit span of the new code build being traced, and the test results for the one or more test phases, to the user interface system, and
wherein the user interface system, based on the received trace identifier, displays the change identifier, the determined time taken per unit span, and the test results for the at least one phase of testing to visually highlight the pass or failure of the code change.

12. The system of claim 9, wherein the CICD server system further comprises a deployment system to receive the tested new code build,
wherein the distributed tracing system generates a trace identifier from the received change identifier, and tests the new code build for at least one production environment based on the at least one predetermined testing parameter that includes the predetermined trace time for the code change of the generated trace identifier, and
wherein the user interface system displays the change identifier, the determined time taken per unit span, and the test results for the at least one production environment to visually highlight the pass or failure of the code change based on the received trace identifier.

13. The system of claim 12, wherein the CICD server system further comprises a deployment system which performs a rollback operation when the test results for the new code build in the one or more production environments determines at least one failure, wherein the rollback operation deploys a predetermined previous code version for execution by the deployment system.

14. The system of claim 12, wherein the instrumentation library transmits a change identifier and one or more tags that identify the at least one production environment to the distributed tracing system,
wherein the distributed tracing system generates a trace identifier from the received change identifier, performs a trace of the new code build based on the trace identifier and the one or more tags, determines the time taken per unit span of the new code build for the one or more production environments, and determines the test results based on the passing or failing of the testing of the code change based on the determined time taken per unit span of the new code build for the one or more production environments.

15. The system of claim 14, wherein the user interface system receives the trace identifier, the determined time taken per unit span, and the determined test results for the one or more production environments, and displays the change identifier, the determined time take per unit span, and the determined test results for the one or more production environments based on the trace identifier.

16. The system of claim 9, wherein the user interface system displays a ranking of one or more components of the tested new code build based on the test results.

* * * * *